US008275607B2

(12) United States Patent
Toutanova et al.

(10) Patent No.: US 8,275,607 B2
(45) Date of Patent: Sep. 25, 2012

(54) SEMI-SUPERVISED PART-OF-SPEECH TAGGING

(75) Inventors: Kristina Nikolova Toutanova, Redmond, VA (US); Mark Edward Johnson, Providence, RI (US)

(73) Assignee: Microsoft Corporation, Redmond, WA (US)

( * ) Notice: Subject to any disclaimer, the term of this patent is extended or adjusted under 35 U.S.C. 154(b) by 1319 days.

(21) Appl. No.: 11/954,212

(22) Filed: Dec. 12, 2007

(65) Prior Publication Data
US 2009/0157384 A1 Jun. 18, 2009

(51) Int. Cl.
*G06F 17/27* (2006.01)
(52) U.S. Cl. ............ 704/9; 704/1; 704/2; 704/4; 704/10
(58) Field of Classification Search .................. 704/4, 9, 704/240
See application file for complete search history.

(56) References Cited

U.S. PATENT DOCUMENTS

| 5,845,306 | A | 12/1998 | Schabes et al. |
|---|---|---|---|
| 6,304,841 | B1 | 10/2001 | Berger et al. |
| 6,314,399 | B1 | 11/2001 | Deligne et al. |
| 6,928,407 | B2 | 8/2005 | Ponceleon et al. |
| 2003/0200077 | A1 | 10/2003 | Leacock et al. |
| 2004/0024581 | A1 | 2/2004 | Koehn et al. |
| 2004/0243409 | A1* | 12/2004 | Nakagawa .................... 704/240 |
| 2005/0071149 | A1* | 3/2005 | Xun et al. .......................... 704/4 |
| 2005/0080613 | A1 | 4/2005 | Colledge et al. |
| 2005/0209844 | A1 | 9/2005 | Wu et al. |
| 2007/0010993 | A1 | 1/2007 | Bachenko et al. |
| 2007/0078642 | A1 | 4/2007 | Weng et al. |
| 2009/0030686 | A1* | 1/2009 | Weng et al. .................... 704/240 |

OTHER PUBLICATIONS

Kristina Toutanova et al., "Feature-Rich Part-of-Speech tagging with a cyclic Dependency Network", 2003, p. 1-8.*
Dandapat et al., "A Hybrid Model for Part-of-Speech Tagging and its Application to Bengali", 2004, Transactions on Engineering, Computing, and Technology, pp. 169-172.*
Oravecz et al., "Efficient Stochastic Part-of-Speech Tagging for Hungarian", 2002, Research Institute for Linguistics, pp. 1-8.*
Jurish, "A Hybrid Approach to Part-of-Speech Tagging", 2003, pp. 1-25.*
Blei, et al., "Latent Dirichlet Allocation", Journal of Machine Learning Research 3, Date: 2003, pp. 993-1022.
Goldwater, et al., "A fully Bayesian Approach to Unsupervised Part-of-Speech Tagging", In Association for Computational Linguistics, Date: 2007, pp. 1-8.
Jordan, et al., "Graphical Models", Date: 2004, pp. 1-20.
Roth, et al., "Part of Speech Tagging Using a Network of Linear Separators", Date: 1998, pp. 1-7.

(Continued)

*Primary Examiner* — Douglas Godbold
*Assistant Examiner* — Mark Villena
(74) *Attorney, Agent, or Firm* — Westman, Champlin & Kelly, P.A.; Theodore M. Magee (57) ABSTRACT

A word is selected from a received text and features are identified from the word. The features are applied to a model to identify probabilities for sets of part-of-speech tags. The probabilities for the sets of part-of-speech tags are used to weight scores for possible part-of-speech tags for the selected word to form weighted scores. The weighted scores are used to select a part-of-speech tag for the word and the selected part of speech tag is stored or output. The scores for the possible part-of-speech tags are based on variational approximation parameters trained from a sparse prior over probability distributions describing the probability of a part-of-speech tag given a word.

8 Claims, 5 Drawing Sheets

OTHER PUBLICATIONS

Schutze Hinrich, "Distributional Part-of-Speech Tagging", In European Association for Computational Linguistics, Date: 1995, pp. 141-148.

Weintraub, et al., "Fast Training and Portability", Date: Apr. 18, 1996, pp. 1-21.

* cited by examiner

SEMI-SUPERVISED PART-OF-SPEECH TAGGING

BACKGROUND

Part-of-speech taggers are used to assign a part-of-speech tag or label to each word in a sequence of words. Since many words can have multiple parts of speech, a part-of-speech tagger must be able to determine the part of speech of a word based on the context of the word in the text. In Hidden Markov Model part-of-speech taggers, this is accomplished by modeling transitions between part-of-speech tags and emission probabilities of individual part-of-speech tags.

The discussion above is merely provided for general background information and is not intended to be used as an aid in determining the scope of the claimed subject matter.

SUMMARY

A word is selected from a received text and features are identified from the word. The features are applied to a model to identify probabilities for sets of part-of-speech tags. The probabilities for the sets of part-of-speech tags are used to weight scores for possible part-of-speech tags for the selected word to form weighted scores. The weighted scores are used to select a part-of-speech tag for the word and the selected part of speech tag is stored or output. The scores for the possible part-of-speech tags are based on variational approximation parameters trained from a sparse prior over probability distributions describing the probability of a part-of-speech tag given a word.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein provide a part-of-speech tagging system that labels words in a text with parts of speech. The part-of-speech tagging is semi-supervised in that it relies on a dictionary containing entries for some but not all words in the text where each entry includes a list of parts of speech that the word can represent and it does not require text labeled for parts-of-speech for training. For words that are not in the dictionary, the part-of-speech tagger relies on an ambiguity class model that indicates the probability of a set of part-of-speech tags given morphological features of the word. A set of part-of-speech tags includes a combination of different part-of-speech tags, with some sets including at least two part-of-speech tags but fewer than all possible part-of-speech tags. The ambiguity class model helps to direct the search for a part-of-speech tag by favoring part-of-speech tags that are part of sets of part-of-speech tags that are highly probable given the morphological features of the word.

The part-of-speech tagger also relies on a Bayesian approach to determining a probability of a tag given a word. Under the Bayesian approach, instead of committing to a single probability distribution to determine the probability of a tag given a word, a distribution over such distributions is formed. This distribution over distributions is governed by a sparse prior Dirichlet distribution that tends to designate one distribution as being much more likely than all other distributions.

Figure 1:
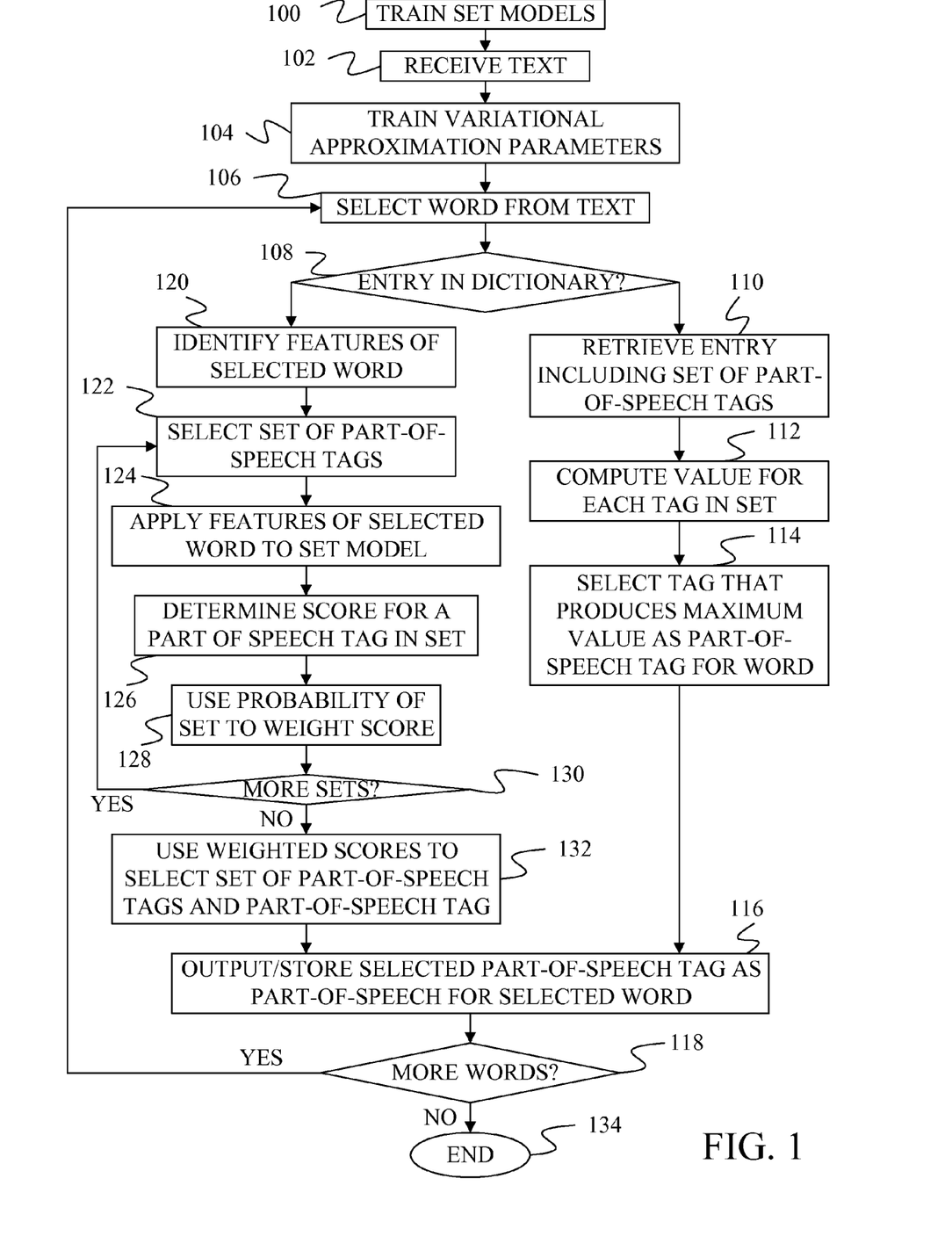
FIG. 1 is a flow diagram of a method of part-of-speech tagging.
Figure 2:
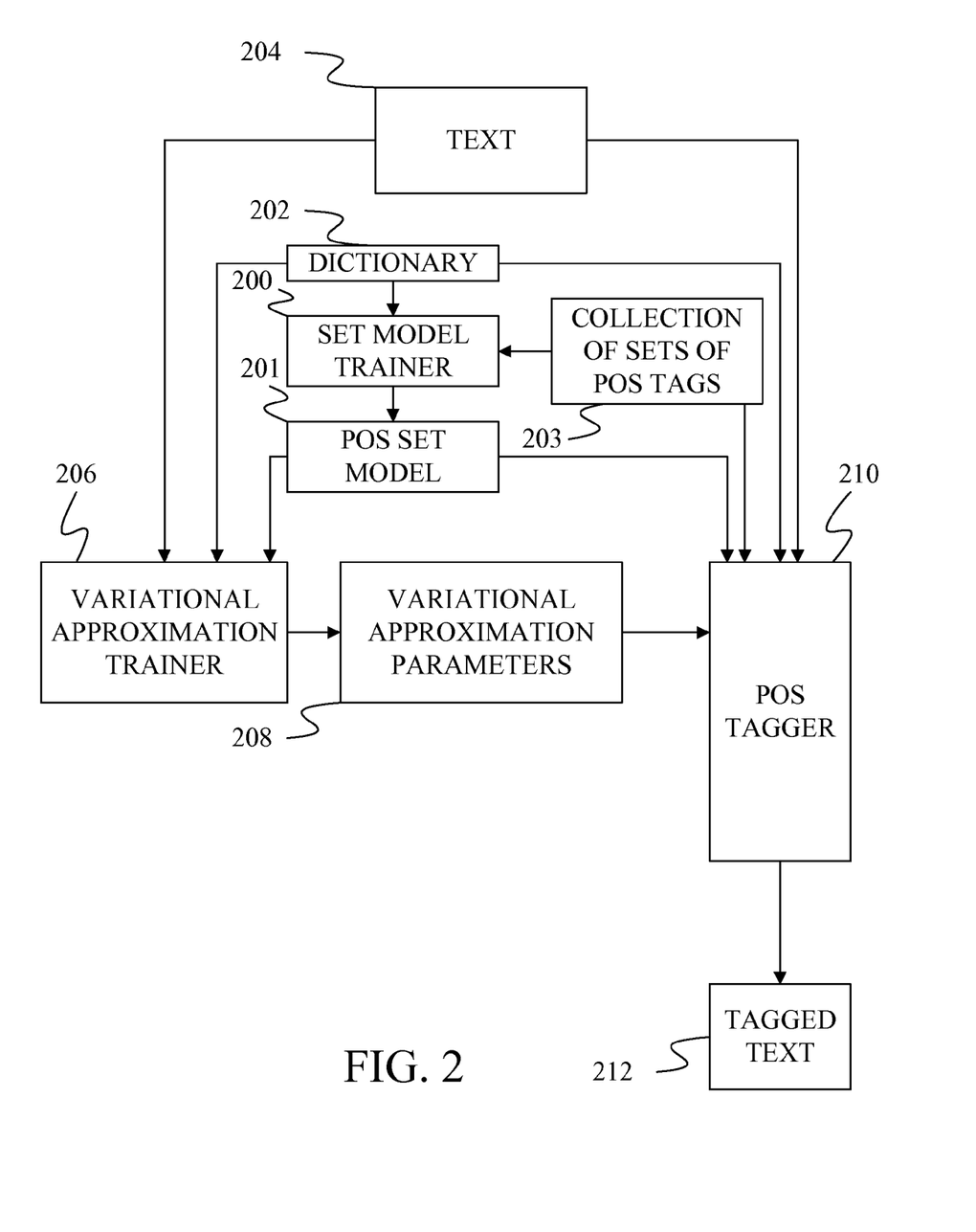
FIG. 2 is a block diagram of elements used in the method of FIG. 1.

FIG. 1 is a flow diagram of a method of training and using model parameters to identify part-of-speech tags for words in a text. FIG. 2 provides a block diagram of elements used in the method of FIG. 1. The elements in FIG. 2 represent data stored on a computer-readable storage medium and computer-executable instructions stored on a computer-readable medium that when executed by a processing unit in a computing device perform the steps shown in FIG. 1.

Figure 3:
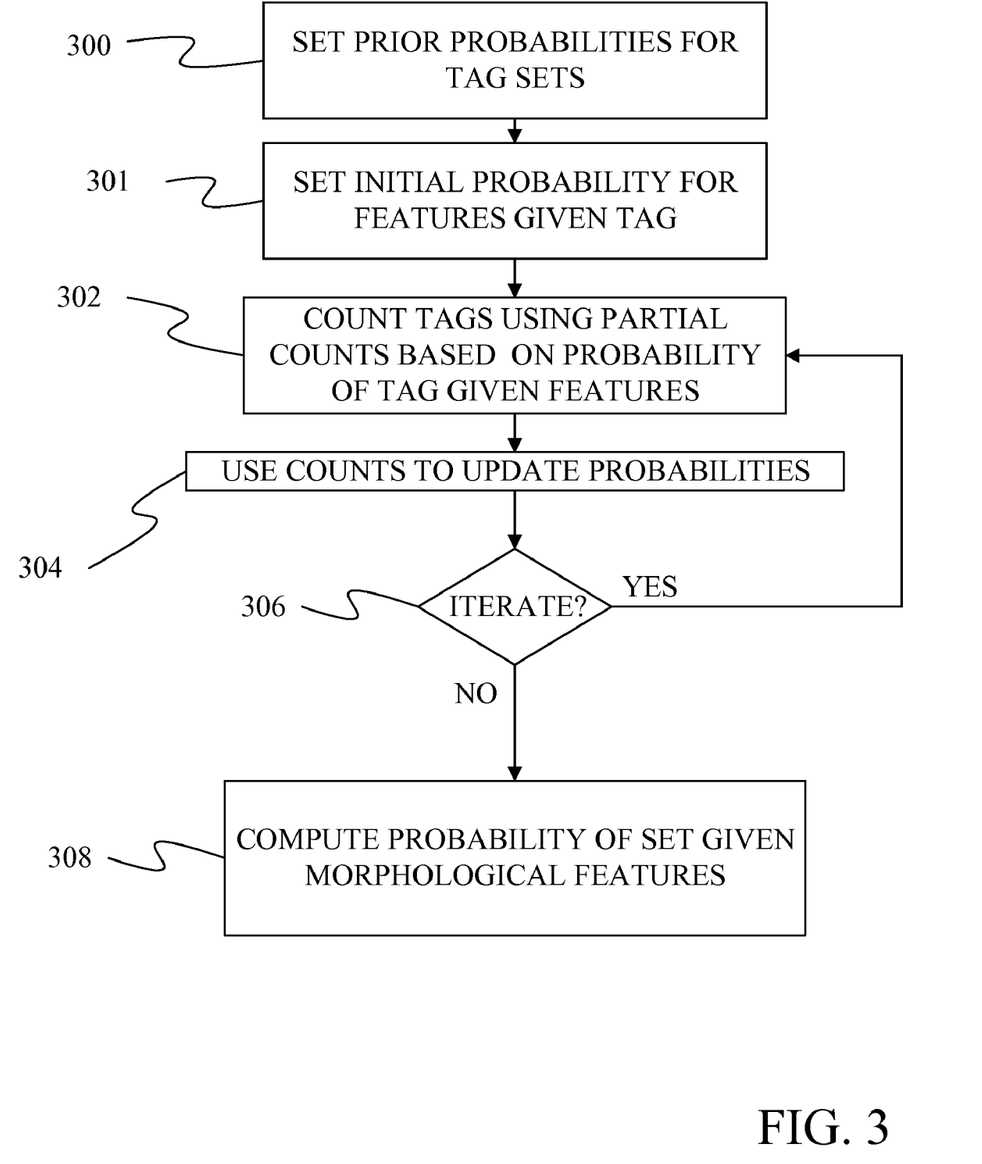
FIG. 3 is a flow diagram of a method of training a tag set model.

In step 100 of FIG. 1, models 201 of sets of part-of-speech tags are trained. Models 201 include probability distributions that describe the likelihood of sets of part-of-speech tags given a vector of morphological features for a word. FIG. 3 provides a flow diagram of steps used to perform step 100 of FIG. 1 under one embodiment.

At step 300 of FIG. 3, a set model trainer 200 of FIG. 2 sets an initial prior probability for each possible set of part-of-speech tags by counting the number of word entries in a dictionary 202 in which each set of part-of-speech tags is found and normalizing over the total number of word entries in dictionary 202. In dictionary 202, a separate entry is provided for each form of a word and includes all of the parts of speech that the can represent in that form as well as morphological feature information such as whether the word is capitalized, whether it contains a hyphen, and whether it contains a digit character.

At step 301, set model trainer 200 sets an initial probability for each element of a morphological feature vector given every possible part-of-speech tag. Under one embodiment, the morphological feature vector contains four elements consisting of a binary feature indicating whether a word is capitalized, a binary feature indicating whether a word contains a hyphen, a binary feature indicating whether a word contains a digit character, and a nominal feature indicating the suffix of a word. Thus, for each binary element, two probabilities would be set for each tag at step 300, one for when the feature equals zero and one for when the feature equals one. Similarly, a separate probability would be provided for each suffix supported by the model. Under one embodiment, the suffix of a word is defined to be the longest character suffix (up to three letters) which occurs in a dictionary 202 as a suffix such that its frequency places it amongst the top 100 most frequent suffixes in dictionary 202. In such an embodiment, 100 probabilities would be determined for each tag at step 300 for this feature. Although four specific morphological features are described above, those skilled in the art will recognize that in other embodiments other features may be used in addition or in place of the four described features.

Under one embodiment, the initial probabilities for each feature given each tag is set equal to one over the number of values of the feature.

Given these probabilities, probabilities for each tag are estimated given the features of each word in the dictionary and its tag set as:

$$P(u \mid m_1, m_2, m_3, m_4, s) = \frac{\frac{1}{|s|} \prod_{j=1}^{4} p(m_j \mid u)}{\sum_{u' \in s} \frac{1}{|s|} \prod_{j=1}^{4} p(m_j \mid u')} \quad \text{EQ. 1}$$

where $p(m_j|u)$ is the probability of the jth morphological feature given a part of speech u, and $|s|$ is the number of part of speech tags in tag set s.

At step 302, set model trainer 200 accesses dictionary 202 to count the number of entries that contain both a particular part-of-speech tag and a particular feature. For dictionary entries that only provide a single part-of-speech for a word, a value of one is added to the current count for that part-of-speech for each feature possessed by the word. If an entry contains multiple parts of speech, partial counts are formed based on the entry, where a partial count is the probability of the tag given the feature of the word given in equation EQ. 1. For example, if the probability of a noun given a capitalized word is 0.5, the count for observing a noun with a capitalized word would be incremented by 0.5 based on an entry having that part-of-speech and that feature.

After the counts have been formed for the tag and feature combinations, the counts are used to update the probability of a feature given a tag at step 304 as:

$$p(m_j \mid u) = \frac{\text{count}(u, m_j)}{\sum_{u'} \text{count}(u', m_j)} \quad \text{EQ. 2}$$

where $p(m_j|u)$ is the probability of a morphological feature $m_j$ given a part-of-speech tag u, $\text{count}(u,m_j)$ is the count formed in step 302 for the combination of part-of-speech tag u and morphological feature $m_j$ and the summation in the denominator of EQ. 2 is performed across all part-of-speech tags u'.

At step 306, set model trainer 200 determines if another iteration of the counts should be performed based on whether the likelihood of the data has converged. If another iteration is to be performed, the process returns to step 302 and the counts are re-determined using the new probabilities determined in step 304 to determine partial counts for part-of-speech tag/feature pairs. The new count is then used to update the probabilities at step 304. Steps 302 and 304 are repeated until set model trainer 200 determiners that no further iterations are required. At step 308, the probability of a set of part-of-speech tags given a vector of morphological features is determined as:

$$p(s \mid m) = \frac{p(s) \sum_{u \subseteq s} p(u \mid s) \prod_{j=1}^{4} P(m_j \mid u)}{\sum_{s'} p(s') \sum_{u' \in s'} p(u' \mid s') \prod_{j=1}^{4} P(m_j \mid u')} \quad \text{EQ. 3}$$

where $p(s|m)$ is the probability of a set of part-of-speech tags s given a vector of features m, $p(s)$ is the prior probability of a set of part-of-speech tags which is computed from the dictionary by counting the number of times a set of part-of-speech tags appears in the dictionary and dividing it by the number of entries, $p(u|s)$ is the probability of a part-of-speech tag u given a set of part-of-speech tags s, which under one embodiment is set equal to one over the number of part-of-speech tags in the set of part-of-speech tags s, $p(m_j|u)$ is the probability of morphological feature $m_j$ given part-of-speech tag u, which is estimated according to the algorithm described above, and the summation in the denominator is performed across all possible sets of tags s'. Under one embodiment, the available sets of part-of-speech tags are defined in a collection of sets of part-of-speech tags 203.

Returning to FIG. 1, after the model 201 of sets of part-of-speech tags has been trained at step 100, text 204 is received by a variational approximation trainer 206 which uses the text to train variational approximation parameters 208 at step 104. The variational approximation parameters 208 are trained to define a variational approximation to a posterior distribution $p(\phi,\theta,t,s_u|s_d,m_u,c_d,c_u,\alpha,\gamma)$, where φ is a vector of parameters of probability distributions that describe the probability of a context word in each position given a tag, θ is a vector of parameters of probability distributions that describe the probability of a tag given every word in the text, t is a vector describing the tags of all word instances in the text, $s_u$ is a vector of tag-sets of all word types which are not in the dictionary, $s_d$ is a vector of tag-sets of all word types which are in the dictionary, $c_u$ and $c_d$ are the contexts of all occurrences of all words that are not in the dictionary and the ones that are in the dictionary, respectively, $m_u$ are the vectors of morphological features of all words not in the dictionary, α is a parameter of a Dirichlet distribution that describes the probability of the probability distributions θ, and γ is a parameter of a Dirichlet distribution that describes the probability of the probability distributions φ.

In one embodiment, θ is described in the posterior probability distribution using a sparse prior Dirichlet distribution that is defined by α. This sparse prior Dirichlet distribution makes more skewed distributions more likely than less skewed distributions. This is expected to provide a stronger model since it correlates to the fact that an individual word will tend to represent a single part-of-speech much more often than other parts of speech even when it can represent multiple different parts of speech. Under one embodiment, α is selected based on the set of part-of-speech tags such that θ is dependent on the set of part-of-speech tags s.

The posterior probability cannot be calculated directly because the computation is intractable. The variational approximation to this posterior distribution is defined under one embodiment as:

$$Q(\varphi, \theta, t, s, s_u \mid c_u, c_d, m_u, s_d, \alpha, \gamma) = \quad \text{EQ. 4}$$

$$\prod_{k=1}^{4} \prod_{l=1}^{T} Dir(\varphi_{k,l} \mid \lambda_{k,l}) \prod_{i=1}^{L_d} Dir(\theta_i \mid \eta_i) \prod_{j=1}^{W_i} P(t_{i,j} \mid v_{i,j})$$

$$\prod_{i=1}^{L_u} P(s_i \mid m_i) Dir(\theta_i \mid \eta_{i,s_i}) \prod_{j=1}^{W_i} P(t_{i,j} \mid v_{i,j,s_i})$$

where $Q(\phi,\theta,t,s_u|\lambda,\eta,\nu)$ is the variational approximation of the posterior distribution, $DIR(\phi_{k,l}|\lambda_{k,l})$ is a Dirichlet distribution of the probability distribution $\phi_{k,l}$ that describes the probability of a context word at context position k given part-of-speech tag l, where the Dirichlet distribution is described by variational approximation parameter vector $\lambda_{k,l}$. Under one embodiment, there are four context word positions representing the two context words before the part-of-speech tag and the two context words after the part-of-speech tag. Note that the context words are not the part-of-speech tags of the neighboring words, but are the individual words themselves. $DIR(\theta_i|\eta_i)$ is a Dirichlet distribution of probability distributions $\theta_i$ that describes a probability of a tag given a word $w_i$ of the $L_d$ different possible words which are in the dictionary and where $\eta_i$ is the variational approximation parameter that describes the Dirichlet distribution. $P(t_{i,j}|v_{i,j})$ is the probability of a part-of-speech tag $t_{i,j}$ for the $j^{th}$ occurrence of word $w_i$ in the text and where $v_{i,j}$ is a variational approximation parameter that describes the multinomial probability distribution $p(t_{i,j})$ that provides the probability of a tag given an the $j^{th}$ occurrence of word $w_i$. Thus a separate variational parameter $v_{i,j}$ is provided for each occurrence of a word in the sequence of words. For every word which is not in the dictionary ($L_u$ indicates the number of such words), $p(s_i|m_i)$ is the probability of a tag-set $s_i$ given the morphological features $m_i$ of the word. Q contains variational parameters for every possible tag-set $s_i$; $Dir(\theta_i|\eta_{i,s_i})$ is the distribution over tags for the word given a particular tag-set $s_i$ and variational parameters, and $$\prod_{j=1}^{w_i} P(t_{i,j}|v_{i,j,s_i})$$

is the probability of an assignment of tags to all instances of the word given a tag-set $s_i$ and variational parameters $v_{i,j,s_i}$.

As shown in EQ. 4, the variational approximation Q is defined such that $\phi$, $\theta$ and t are independent given the tag-sets.

To train the variational approximation parameters $\lambda_{k,l}, \phi_i$ and $v_{i,j}$, an iterative maximization algorithm is used under one embodiment. In particular, the variational approximation parameter $\lambda_{k,l}$ is first fixed and then variational approximation parameters $\eta_i$, $v_{i,j}$, $\eta_{i,s_i}$ and $v_{i,j,s_i}$ are chosen to maximize a lower bound on the log likelihood of the data defined as:

$$L = E_Q[\log P(\phi,\theta,t,s_u,c_d,c_u|s_d,m_u,\alpha,\gamma)] - E_Q[\log Q(\phi,\theta,t,s_u)] \quad \text{EQ. 5}$$

where $E_Q[\log P(\phi,\theta,t,s_u,c_d,c_u|s_d,m_u,\alpha,\gamma)]$ is the expectation with respect to Q of the log of the joint distribution of the contexts and the hidden variables and where $E_Q[\log Q(\phi,\theta,t,s_u)]$ is the expectation with respect to Q of the log of Q of EQ. 4.

After $\eta_i$, $v_{i,j}$, $\eta_{i,s_i}$ and $v_{i,j,s_i}$ have been determined, their values are fixed and EQ. 5 is maximized with respect to $\lambda_{k,l}$. These steps are repeated until the change in the variational bound falls below a threshold. Under one embodiment, 100 iterations were necessary. Given a variational distribution Q, it is then possible to maximize the lower bound on the log likelihood with respect to $\alpha$. Since $\alpha$ is determined by a single value parameter, the lower bound is maximized with respect to $\alpha$ using a simple grid search.

Because the log likelihood is defined by using a sparse prior on $\theta$, the variational approximation parameters are trained based on a sparse prior distribution of probability distributions that describe the probability of a part-of-speech tag given a word. The variational approximation parameters are also trained based on the sequence of words.

After variational approximation trainer 206 has trained the variational approximation parameters, they are stored as variational approximation parameters 208 on a computer-readable storage medium.

At step 106, a word is selected from text 204 by a part-of-speech tagger 210. At step 108, part-of-speech tagger 210 determines if the selected word has an entry in dictionary 202. If the word has an entry in dictionary 202, part-of-speech tagger 210 retrieves the entry including the set of part-of-speech tags for the entry at step 110. At step 112, part-of-speech tagger 210 computes a value for each tag in the set of part-of-speech tags based on the variational approximation parameters $v_{i,j}$ and the probability $p(t_{i,j}|v_{i,j})$. At step 114, the part-of-speech tag that produces the maximum probability $p(t_{i,j}|v_{i,j})$ is selected as the tag for the selected word. The selected part-of-speech tag is then output or stored as tagged text 212 at step 116. At step 118, part-of-speech tagger 210 determines if there are more words in the received text. If there are more words, the process returns to step 106 to select the next word from the text.

If the selected word from the text does not have an entry in the dictionary at step 108, probabilities for sets of part-of-speech tags given the morphological features of the word are further utilized to determine a part-of-speech tag for a word.

Determining the probabilities of part-of-speech tags begins at step 120 where the features of the selected word are identified. Thus, under one embodiment, it is determined whether the selected word is capitalized, whether it contains a hyphen, whether it contains a digit character, and the form of its suffix, if any. At step 122, a set of part-of-speech tags is selected from the collection of sets of part-of-speech tags 203. At step 124, the features of the selected word are applied to EQ. 3 above along with the probability of the selected set of part-of-speech tags to determine the probability of the set of part-of-speech tags given the features of the selected word. Note that although the part-of-speech model 201 was trained from the dictionary, the dictionary lacks an entry for the selected word at step 124.

Figure 4:
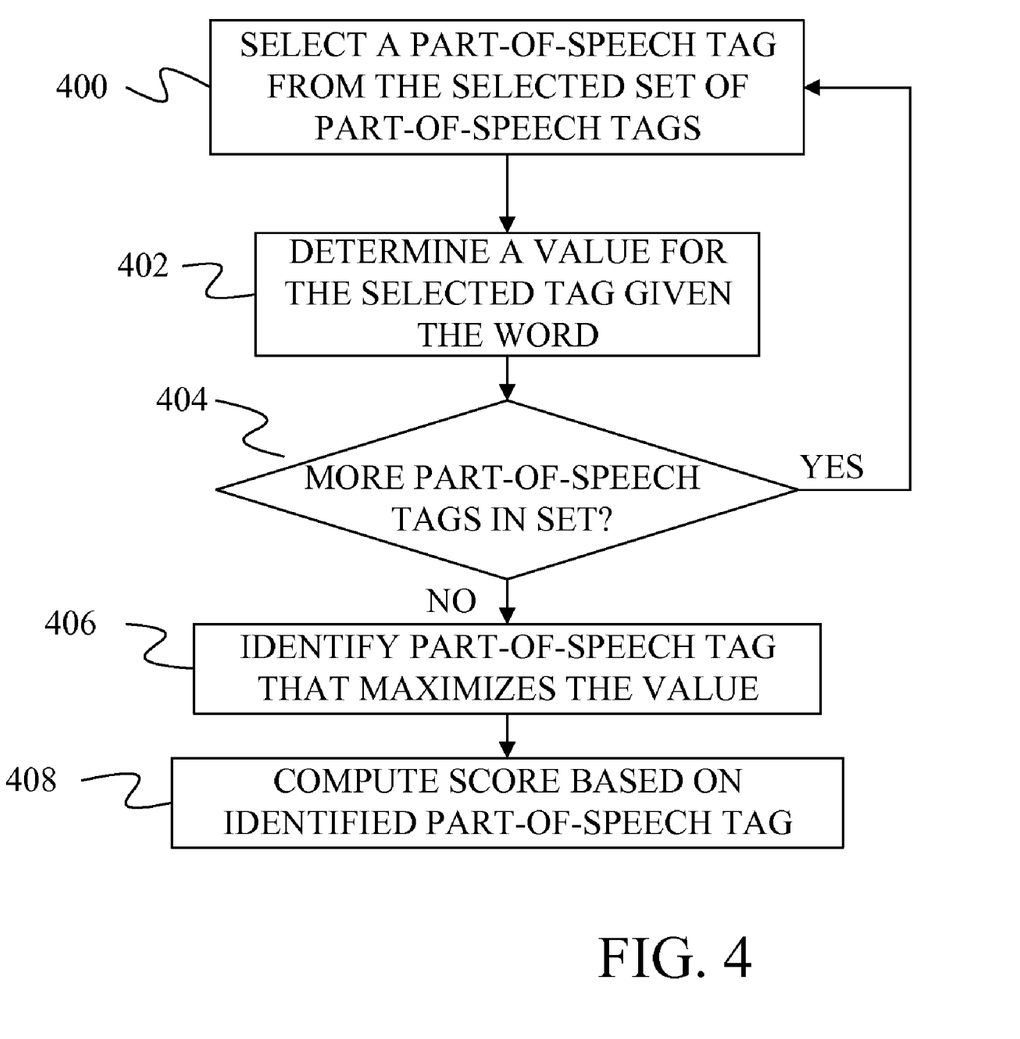
FIG. 4 is a flow diagram of a method of determining a score for a part-of-speech tag in a set.

At step 126, a score is determined for a part-of-speech tag in the set. FIG. 4 provides a flow diagram of a method for determining a score for a part-of-speech tag in a set.

At step 400 of FIG. 4, part-of-speech tagger 210 selects a part-of-speech tag from the selected set of part-of-speech tags. At step 402, a value is determined for the selected tag given the word by determining the probability of the tag using the distribution $p(t_{i,j}|v_{i,j,s})$, where $v_{i,j,s}$ is the variational approximation parameter determined for the word selected at step 106 for a tag-set s. At step 404, a determination is made as to whether there are more parts of speech tags in the set of part-of-speech tags. If there are more part-of-speech tags, the process returns to step 400 to select the next part-of-speech tag and a value is determined for the new part-of-speech tag at step 402 using the probability distribution $p(t_{i,j}|v_{i,j,s})$. When there are no more part-of-speech tags in the set of part-of-speech tags, the part-of-speech tag that has the maximum value based on the probability $p(t_{i,j}|v_{i,j,s})$ is selected. A score is then computed based on the identified part-of-speech tag. Under one embodiment, this score is computed as $p(t_{i,j}|v_{i,j,s})$.

The score computed in step 408 is returned as the score determined at step 126 for the part-of-speech tag in the set.

At step 128, the score determined at step 126 is weighted by the probability of the set of part-of-speech tags given the morphological features computed at step 124 to form a weighted score for the set of part-of-speech tags. In particular, the probability determined in step 124 is multiplied by the score determined in step 126 to form the weighted score.

At step 130, part-of-speech tagger 210 determines if there are more sets of part-of-speech tags. If there are more sets of part-of-speech tags, the next set of part-of-speech tags is selected at step 122 and steps 124, 126 and 128 are repeated for the next set of part-of-speech tags. When all of the sets of part-of-speech tags have been processed at step 130, the weighted scores are used to select the set of part-of-speech tags and the part-of-speech tag in the set that is most likely for the selected word at step 132. In particular, the set of part-of-speech tags that produces the highest weighted score is selected at step 132 and the part-of-speech tag used to determine the weighted score for the set of part-of-speech tags is identified as the part-of-speech tag for the word. The selected part-of-speech tag is then output or stored as the part-of-speech for the selected word at step 116. The part-of-speech tags for the words in text 204 are stored as tagged text 212, which may be displayed to a user or alternatively may be stored on a computer-readable medium. When all of the words in the text have been processed at step 118, the process ends at step 134.

Figure 5:
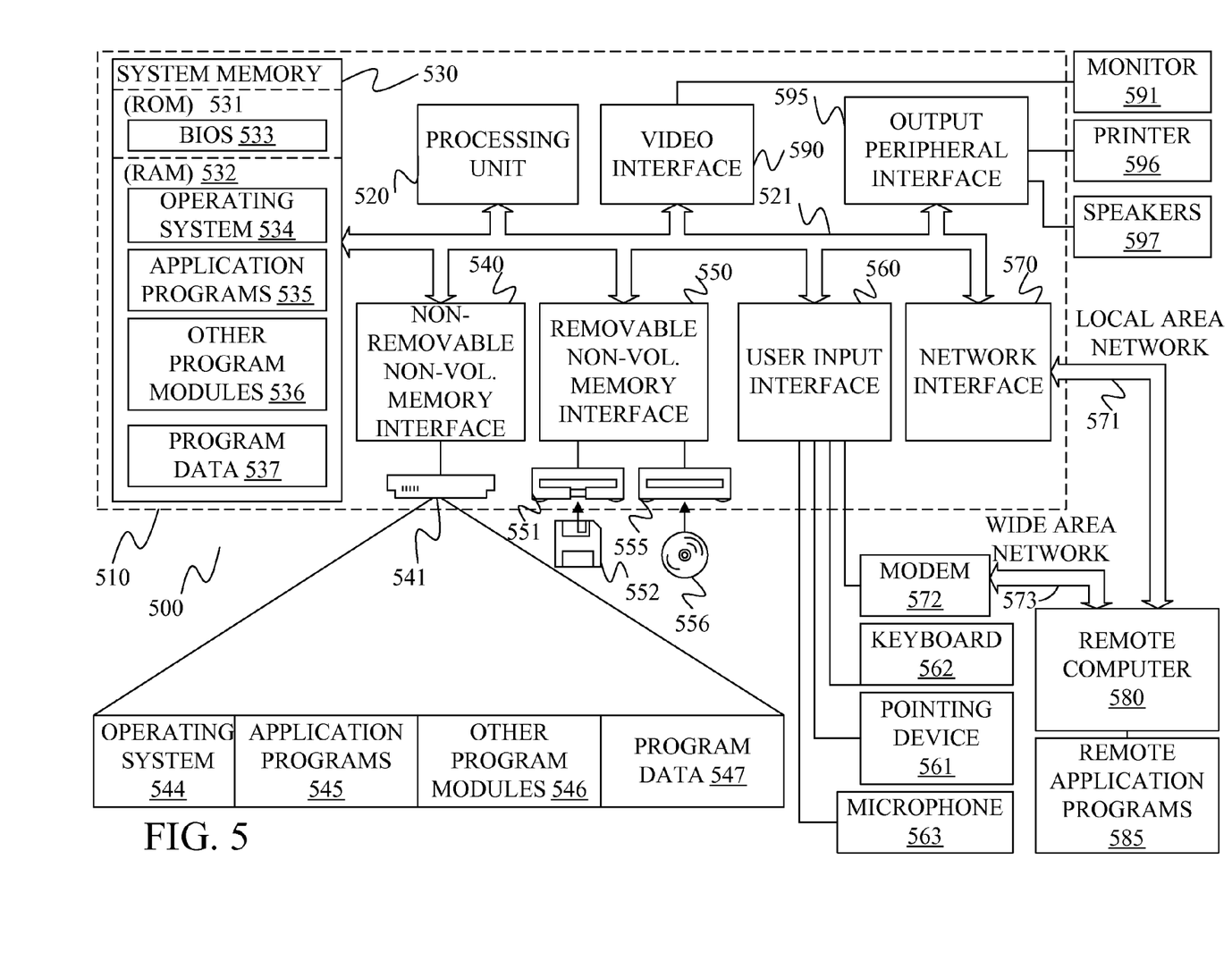
FIG. 5 is a block diagram of an exemplary computing environment in which embodiments may be practiced.

FIG. 5 illustrates an example of a suitable computing system environment 500 on which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of methods or computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 5, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer-readable storage media and communication media. Computer-readable storage media includes both volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. Under some embodiments, application programs 545 include computer-executable instructions that when executed by processing unit 520, cause processing unit 520 to operate as set model trainer 200, variational approximation trainer 206 and part-of-speech tagger 210, and which cause processing unit 520 to execute the steps shown in FIGS. 1, 3 and 4.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving a text comprising a sequence of words;
selecting a word from the text;
identifying features of the selected word, the features comprising a suffix of the selected word;
applying the features of the selected word to a model to identify probabilities for sets of part-of-speech tags, at least one set of part-of-speech tags comprising at least two part-of-speech tags, each part-of-speech tag representing a part-of-speech;
with a processor, using the probabilities for sets of part-of-speech tags to weight scores for possible part-of-speech tags for the selected word to form weighted scores by performing steps for each set of part-of speech tags, the steps comprising:
selecting a variational approximation parameter that is dependent on the selected word, an occurrence number for the word and the set of part of speech tags wherein the variational parameter is trained from a sparse prior distribution of probability distributions that describe a probability of a part-of-speech tag given a word;
determining a separate value for each part-of-speech tag in the set of part-of-speech tags by using the selected variational approximation parameter;
selecting from the set of part-of-speech tags the part-of-speech tag with the largest value;
computing a score using the selected part-of-speech tag; and weighting the score by the probability of the set of part-of-speech tags;
using the weighted scores to select a part-of-speech tag for the selected word; and
storing the selected part-of-speech tag for the selected word.

2. The method of claim 1 wherein the features of the selected word further comprise whether the selected word is capitalized in the text, whether the selected word contains a hyphen and whether the selected word contains a digit character.

3. The method of claim 1 wherein using the weighted scores to select a part-of-speech tag comprises selecting the set of part-of-speech tags that produces the largest weighted score and selecting the part-or-speech tag in the selected set of part-of-speech tags that is associated with the largest value in the set of part-of-speech tags.

4. The method of claim 1 wherein the model is trained based on entries in a dictionary, each entry identifying features of a word and a set of part-of-speech tags for the word, the dictionary lacking an entry for the selected word in the text.

5. The method of claim 4 wherein the model is trained by forming partial counts of part-of-speech tags based on a probability of a part-of-speech tag given a set of features.

6. A method comprising:
receiving a text;
selecting a first word in the text;
retrieving an entry for the first word from a dictionary stored on a computer-readable storage medium, the entry indicating a set of part-of-speech tags associated with the first word;
using the set of part-of-speech tags from the entry to identify a part-of-speech tag for the first word wherein using the set of part-of-speech tags from the entry to identify a part-of-speech tag for the first word comprises selecting a part-of-speech tag from the set of part-of-speech tags and computing a value for the selected part-of-speech tag using a variational approximation parameter that is selected based on an occurrence number of the first word and that describes a probability distribution of the part-of-speech tag, wherein the variational approximation parameter is trained based in part on a sparse prior distribution of probability distributions that provide a probability of a part-of-speech tag given a word;

storing the part-of-speech tag for the first word on a computer-readable storage medium;

selecting a second word in the text;

determining that the dictionary does not have an entry for the second word;

with a processor, selecting a part-of-speech tag for the second word based in part on probabilities of sets of part-of-speech tags given features of the second word; and storing the part-of-speech tag for the second word on a computer-readable storage medium.

7. The method of claim 6 wherein selecting a part-of-speech tag for the second word based in part on probabilities of sets of part-of-speech tags given features of the second word comprises determining a score for each part-of-speech tag in a set of part-of-speech tags, determining which score is a maximum score, weighting the maximum score by the probability of the set of part-of-speech tags given the features of the second word to form a set score for the set of part-of-speech tags, selecting a set of part-of-speech tags based on the set score, and selecting the part-of-speech tag associated with the maximum score of the selected set of part-of-speech tags.

8. The method of claim 7 wherein features of the second word comprise whether the word is capitalized, whether the word contains a hyphen, whether the word contains a digit, and the suffix of the word.

\* \* \* \* \*